United States Patent Office 3,485,605
Patented Dec. 23, 1969

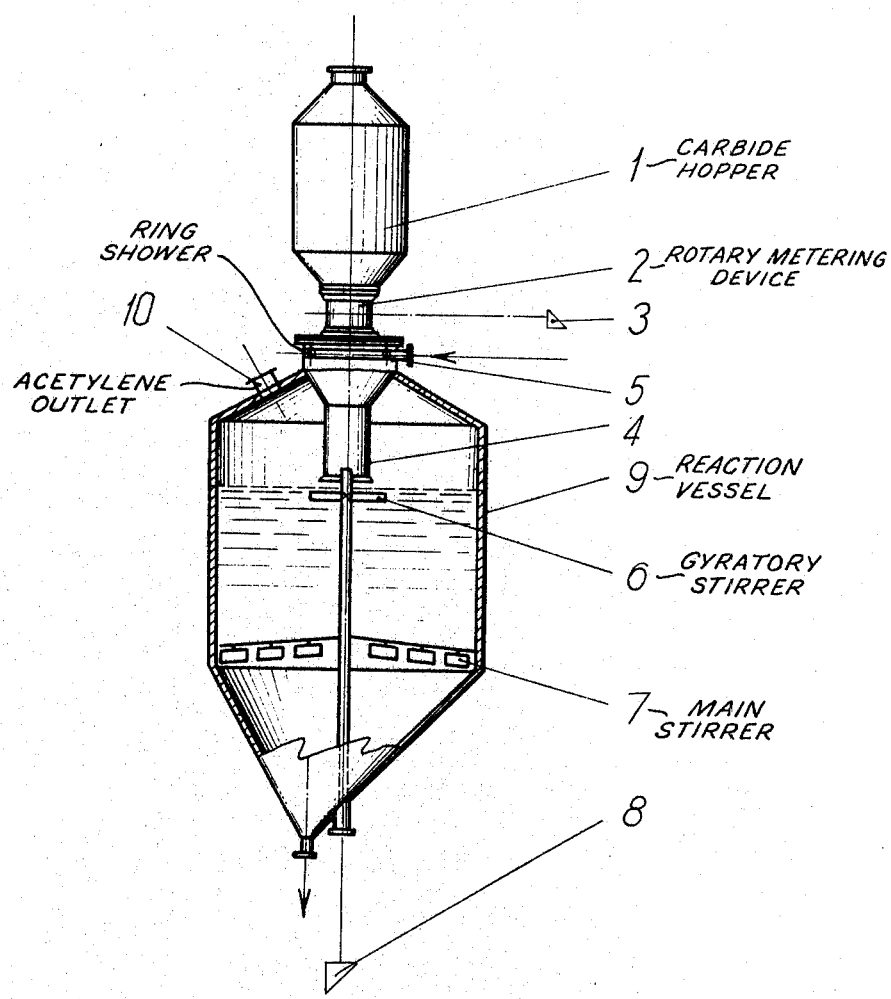

3,485,605
METHOD OF AND APPARATUS FOR THE PRODUCTION OF ACETYLENE
Dumitru Ghita, 20 str. Panait Motoiu; Nastase Saizescu, 5 str. Batistei; and Razvan Bolintineanu, 7 str. Schitu Maicilor, all of Bucharest, Rumania
Filed June 2, 1966, Ser. No. 554,802
Claims priority, application Rumania, June 15, 1965, 49,887
Int. Cl. C10h 15/14
U.S. Cl. 48—1  3 Claims

ABSTRACT OF THE DISCLOSURE

Production of acetylene wherein carbide powder with a particle size up to 4 mm. and obtained as a waste product of carbide production is fed by a rotary feeder through a funnel with a narrow neck into a generator containing a bath of water. Within the neck, a spray ring brings the cascading carbide powder into contact with water droplets while unreacted carbide is stirred into the water by rotating blades at the surface of the latter. Efficient interaction of the carbide powder and the water is achieved by providing a further set of blades, rotating counter to the first-mentioned set, at another location along the bath. Acetylene gas is extracted at a location above the bath.

---

Our present invention relates to a method of and an apparatus for the continuous production of acetylene in a wet generator.

While large-capacity generators for the production of acetylene in a dry state at rates of about 2000 m.³/hour (STP) have been proposed heretofore for use with carbide powders, these generators are characterized by poor yields because some of the carbide fails to react, by the production of acetlylene containing carbon monoxide and carbon dioxide as impurities, by reactions at high temperature which may lead to the decomposition and explosion of acetylene, by the need of sensitive apparatus for controlling and measuring the production, and by the need for stages for crushing the carbide to a particle size sufficient to permit the reaction.

It is an object of the present invention to provide a method and an apparatus for eliminating these inconveniences.

This object is attained, in accordance with the present invention which provides a method of and an apparatus for the production of acetylene in a wet state. According to the present invention, carbide powder with a particle size of less than 4 mm., as obtained as a waste product in the manufacture of carbide, is dispensed from a hopper through a rotary alveolar dispenser or metering device (pages 7–33 of Perry's Chemical Engineer's Handbook, McGraw Hill Book Co., 1963), which may also be referred to as a rotary vane or rotary plate feeder, into a funnel whose narrow neck extends into a generator chamber containing a water bath located below this neck. Within the funnel, the descending powder is subjected to treatment with water in finely divided form through an annular spray arrangement producing a ring shower. Part of the powder reacts in the funnel and its narrow neck before contacting the water bath while unreacted carbide falling upon the water bath is dispersed into the latter by a system of rotary blades at the outlet of this neck. The bath within the generating chamber is stirred further by another set of blades rotating counter to the first at an axial spacing below the latter. Acetylene is removed above the water bath.

The aforedescribed system has the advantage that it can produce 10–50 m.³/hour (STP) of acetylene from carbide powder which is otherwise considered a waste product of carbide production. Generation of acetylene takes place at a low temperature (e.g. 50° C.), thereby excluding explosion, and the product is free from carbon dioxide and carbon monoxide so that it can be used, without purification, in welding operations.

The above and other objects, features and advantages of this invention will become more readily apparent from the following description, reference being made to the accompanying drawing, the sole figure of which is an elevational view, partly broken away, of an apparatus for carrying out the method of the present invention.

In the drawing, we have shown an apparatus for producing acetylene which comprises an intermediate bunker or storage hopper 1 from which waste carbide powder having a particle size of up to 4 mm. is continuously fed to the generator by means of a rotary-vane metering device represented at 2 in the form of a substantially continuous sheet. From the measuring device 2, the carbide powder cascades through a feeder funnel with a narrow neck 4 in which the powder is washed with a fine water shower or spray. From the funnel neck 4, the powder enters the generator 9 containing a water bath. The distance from the measuring device 2 to the water surface in the generator is calculated so that the major part of the carbide powder reacts in the funnel in neck 4 before reaching the water surface. In the funnel 4, just below the metering device 2, an annular nozzle 5 forms the ring shower to which the carbide powder is subjected. The acetylene produced in the feeding funnel 4 is forced to pass through a water layer of about 10 cm. in the generator before exiting through outlet 10. As the unreacted carbide powder is deposited on the surface of the water, rotary blades 6 which are free to gyrate at the top of the stirrer shaft, are rotated to prevent the formation of clods or agglomerates of powder. Below the blades 6, a further set of blades 7, carried by the shaft and driven by motor 8, is rotatable in the opposite sense, thereby breaking up any clods which might have formed despite the rotation of blades 6. The gyratory movement of blades 6 and interaction of the counterrotating blades 6 and 7 prevents the carbide powder from accumulating at the walls of the vessel and forming agglomerates there.

What is claimed is:
1. A method of continuously producing acetylene, comprising the steps of continuously metering carbide powder with a maximum particle size of 4 mm., in a cascade downwardly into a water bath, subjecting said cascade of carbide powder to a finely divided water spray, thereby wetting the major portion of the carbide powder while the balance of said carbide powder enters the water bath; subjecting the water bath to stirring with a pair of counterrotating blades at least one of which is disposed substantially at the point at which the cascade of powder enters the water bath, thereby producing acetylene in said bath; and removing acetylene from above said bath.

2. An apparatus for the production of acetylene in the wet state, comprising a vessel receiving a water bath and having an outlet thereabove for the discharge of acetylene from the vessel, a funnel with a narrow neck above the water bath in said vessel, said neck having a mouth opening downwardly into said water bath; rotary means above said funnel for dispensing a continuous cascade of carbide powder into said funnel and through said neck into said bath; annular spray means between said rotary means and said neck for subjecting the cascade of powder therein to treatment with a fine ring-shaped shower of water; and stirrer means in said bath below said mouth for preventing agglomeration of carbide powder in said bath.

3. The apparatus defined in claim 2 wherein said stirrer means includes a first set of blades disposed in said bath immediately below said mouth and adapted to gyrate in one sense and a second set of blades below said first set and rotatable in the opposite sense.

References Cited

FOREIGN PATENTS 5,090  12/1895  Norway.

MORRIS O. WOLK, Primary Examiner

J. D. OLSEN, Assistant Examiner

U.S. Cl. X.R.

48—2, 4, 38